(12) United States Patent
Torla

(10) Patent No.: US 7,970,128 B2
(45) Date of Patent: Jun. 28, 2011

(54) SYSTEMS AND METHODS FOR EFFICIENT GENERATION OF HASH VALUES OF VARYING BIT WIDTHS

(75) Inventor: Michael J. Torla, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 1011 days.

(21) Appl. No.: 11/781,097

(22) Filed: Jul. 20, 2007

(65) Prior Publication Data

US 2009/0022307 A1    Jan. 22, 2009

(51) Int. Cl.
*H04K 1/00* (2006.01)
*H04L 9/00* (2006.01)
*H04L 9/28* (2006.01)

(52) U.S. Cl. ......................................................... 380/28

(58) Field of Classification Search ...................... 380/28
See application file for complete search history.

(56) References Cited

U.S. PATENT DOCUMENTS

| | | | |
|---|---|---|---|
| 7,142,669 | B2 | 11/2006 | Dworkin et al. |
| 7,181,009 | B1 * | 2/2007 | Huxel ............................. 380/28 |
| 7,649,990 | B2 * | 1/2010 | Plessier et al. .................. 380/28 |
| 2002/0066014 | A1 * | 5/2002 | Dworkin et al. ............... 713/168 |

OTHER PUBLICATIONS

Satoh, Akashi, et al., ASIC hardware focused comparison for hash functions MD5, RIPEMD-160, and SHS, Information Technology: Coding and Computing, 2005. ITCC 2005. International Conference onvol. 1, Apr. 4-6, 2005 pp. 532-537 vol. 1.
McEvoy, Robert, et al., Optimisation of the SHA-2 family of hash functions on FPGAs, Emerging VLSI Technologies and Architectures, 2006. IEEE Computer Society Annual Symposium onvol. 00, Mar. 2-3, 2006 pp. 6 pp.
Aisopo, Fotis, et al., A novel high-throughput implementation of a partially unrolled SHA-512, Electrotechnical Conference, 2006. MELECON 2006. IEEE Mediterranean May 16-19, 2006 pp. 61-65.
McLoone, M., et al., Efficient single-chip implementation of SHA-384 and SHA-512, Field-Programmable Technology, 2002. (FPT). Proceedings. 2002 IEEE International Conference on Dec. 16-18, 2002 pp. 311-314.
Li, Chang-Yun, et al., Hardware Implementation of Hash Function SHA-512, Innovative Computing, Information and Control, 2006. ICICIC '06. First International Conference onvol. 2, 30-Aug. 1, 2006 pp. 38-42.

* cited by examiner

*Primary Examiner* — Kambiz Zand
*Assistant Examiner* — Stephen Sanders
(74) *Attorney, Agent, or Firm* — Ingrassia Fisher & Lorenz, P.C.

(57) ABSTRACT

A technique for producing a hashed output of an input message according to any number of hash algorithms (e.g. SHA-256, SHA-348, SHA-512) having varying bit widths is described. At least a portion of the input message is stored in a first group of registers each having a bit width equal to a first bit width (e.g. 32 bits). If the selected hash algorithm has a larger bit width (e.g. 64 bits), a remainder of the input message is stored in a second plurality of registers each having a bit width equal to the first bit width. The hashed output is then computed according to the selected hash algorithm.

20 Claims, 2 Drawing Sheets

SYSTEMS AND METHODS FOR EFFICIENT GENERATION OF HASH VALUES OF VARYING BIT WIDTHS

TECHNICAL FIELD

The disclosed subject matter relates generally to digital cryptography, and more particularly to systems and techniques for efficiently generating hash values used in message digests and the like. Even more particularly, various embodiments relate to techniques and systems for efficiently generating hash results using different techniques of various bit widths.

BACKGROUND

Hash functions are any algorithms or other techniques used in computing a condensed digital representation of an input message. That is, hash functions are any reproducible techniques capable of creating a digital "fingerprint" that is representative of the input message, but ideally much smaller. Hash functions are commonly used in digital cryptography and other applications to ensure that a transmitted message arrives intact, without even minor variation. A cryptographically secure hash function, for example, is designed to compute a condensed representation (often called a "digest") of the original message that is unique to the original message, yet it remains computationally infeasible to ascertain the original message from the digest or to find two different messages that result in the same digest.

A number of well-known secure hash algorithms include the SHA-1, SHA-224, SHA-256 and other algorithms published by the National Institute of Standards and Technology, which are generally based upon 512-bit data blocks and 32-bit data words. More recently, newer algorithms such as SHA-384 and SHA-512 have been published that are based upon 1024-bit blocks and 64-bit words. While these newer standards are well-suited to video and other large-block data, they do typically require a sixty-four bit path for implementation rather than the 32-bit path used in prior algorithms. While this wider bit path may be useful in certain instances, it can entail significant re-design of the 32-bit architectures used in prior designs. Moreover, many Internet security standards and the like still rely upon older, 32-bit techniques, so a 64-bit implementation may represent excess and unused capacity for the majority of the hash computations carried out by many devices. As a result, it is desirable to create hashing systems and techniques that efficiently yet effectively process hash functions of varying bit widths.

BRIEF DESCRIPTION OF THE DRAWINGS

A more complete understanding of the disclosed subject matter may be derived by referring to the detailed description and claims when considered in conjunction with the following figures, wherein like reference numbers refer to similar elements throughout the figures.

DETAILED DESCRIPTION

Figure 1:
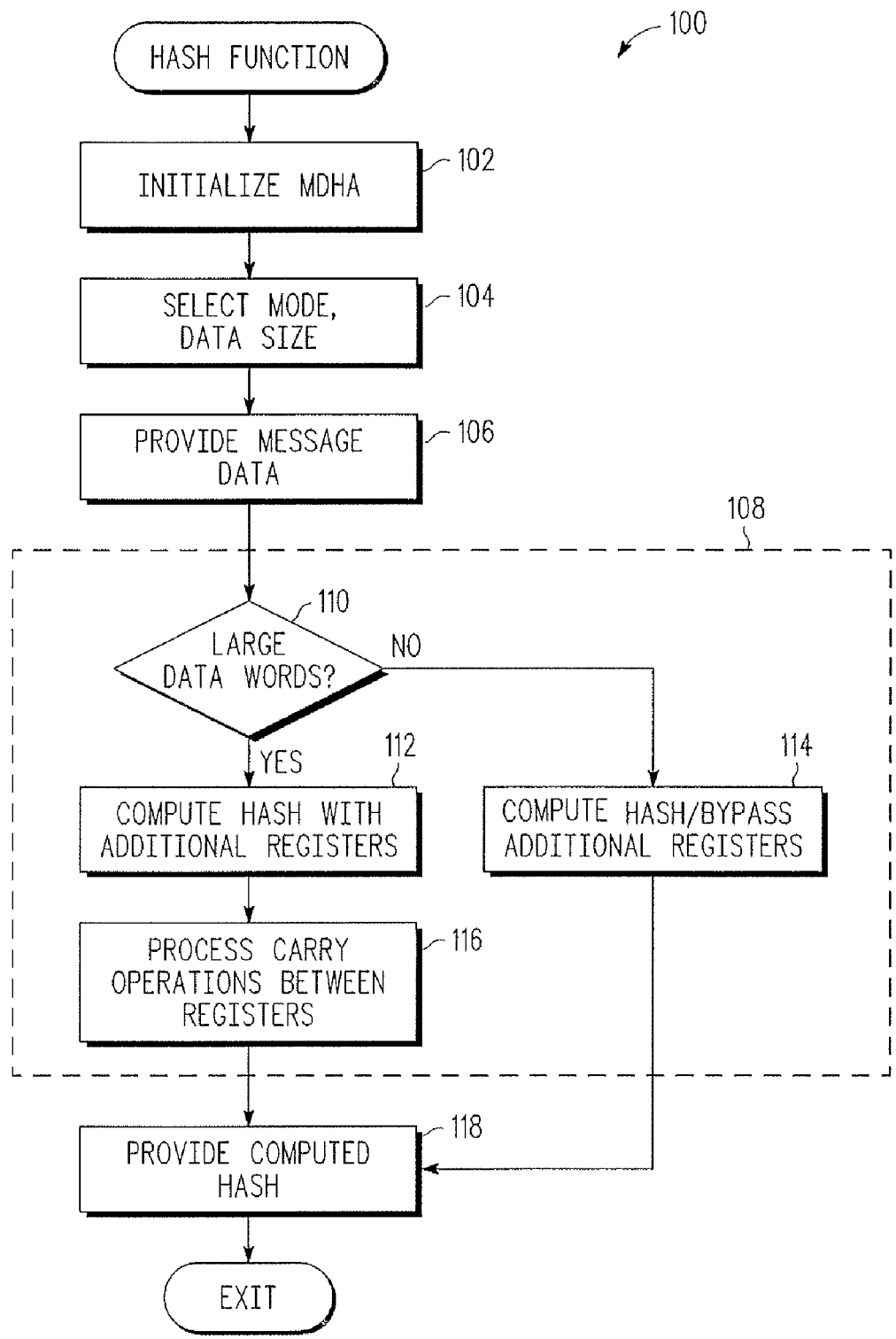
FIG. 1 is a flowchart of an exemplary technique for computing a hash output based upon an input message.

The following detailed description is merely illustrative in nature and is not intended to limit the disclosed embodiments or the application and uses of such embodiments. Furthermore, there is no intention to be bound by any expressed or implied theory presented in the preceding technical field, background, brief summary or the following detailed description.

According to various exemplary embodiments, a message digest hardware accelerator (MDHA) is able to compute hash functions in multiple bit widths through the use of multiple banks of narrow-bit-width registers. A digest that is sixty-four bits wide, for example, can be computed using two sets of thirty-two bit registers, with separate registers maintaining the high and low bits of the stored data. During bitwise arithmetic functions (e.g. bitwise addition, arithmetic or logical bit shifts, bit rotates, and the like) a carry bit may be processed from the register holding the least significant bits of a data word to the register holding the more significant bits of the same word. By providing two sets of relatively narrow-width registers and then processing carries appropriately, wider bit width features can be incorporated into the MDHA without significant re-design of legacy systems.

Before turning to the details of various embodiments, it should be noted that the subject matter may be described herein in terms of functional and/or logical block components and various processing steps. Such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors, hardware accelerators and/or other control devices. In addition, those skilled in the art will appreciate that the embodiments may be practiced in conjunction with any number of data processing techniques and protocols, and that the electronic devices described herein are merely exemplary applications for the disclosed subject matter.

For the sake of brevity, conventional techniques related to integrated circuit device fabrication and design, digital logic gates and their hardware implementations, scan testing, digital data processing, and other functional aspects of the devices (and the individual operating components of the devices) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment. Moreover, although the schematics shown in various drawing figures depict particular arrangements of elements, additional intervening elements, devices, features, or components may be present in an actual embodiment (assuming that the described functionality is not adversely affected).

The following description refers to nodes or features or elements being "connected" or "coupled" together. As used herein, unless expressly stated otherwise, "connected" means that one node/feature/element is directly connected to another node/feature/element, and not necessarily mechanically. As used herein, unless expressly stated otherwise, "coupled" means that one node/feature/element is directly or indirectly coupled to another node/feature/element, and not necessarily mechanically.

The word "exemplary" is used herein in the context of "example" embodiments, and not necessarily in the context of "model" embodiments. Other equivalent embodiments may have different features, characteristics or arrangements from the "exemplary" embodiments described herein.

Turning now to the drawing figures, FIG. 1 is a flowchart of an exemplary technique 100 for processing hash functions of various bit widths using two sets of registers, each with a relatively narrow bit width (e.g. 32-bits). Technique 100 may be implemented in any sort of hardware, software and/or firmware logic, including any sort of MDHA or the like. In various embodiments, technique 100 is implemented in a semiconductor chip having an MDHA module constructed using conventional very large scale integration (VLSI) techniques or the like. Typically, an MDHA combines similar functions of multiple hashing algorithms (e.g. various SHA algorithms, MD4, MD5, etc.) into a relatively small, streamlined area on the semiconductor wafer. An MDHA may include circuitry to automate the process of generating a hashed message authentication code (HMAC) according to the FIPS 198 and/or RFC 2104 standards, for example. One example of a 32-bit MDHA is described in U.S. Pat. No. 7,142,669, although other embodiments may use different types of logic implemented in any manner.

The hash process 100 suitably begins by initializing the MDHA (step 102) in any manner. In various embodiments, step 102 involves preparing the MDHA for receiving an input message, and may be accomplished through hardware and/or software reset of the MDHA logic or the like. In various embodiments, the contents of the MDHA registers may be initialized to any value (e.g. logic zero or one), and the input message may be formatted, padded or otherwise processed as appropriate prior to digest creation. Initialization step 102 need not take place in every iteration of process 100, but rather may take place at system boot up or any other time as appropriate.

Prior to creating the hash digest, the MDHA typically receives configuration information regarding a selected hash algorithm (e.g. SHA-1, SHA-256, SHA-512, MD5, etc.), and other parameters as appropriate (step 504). This information may contain an indication of a hash algorithm selected by a process, application or other logic in communication with the MDHA. During computation, the size of data words processed is generally dependent upon the hash algorithm, with SHA-384 and SHA-512 typically demanding a 64-bit data width and other algorithms demanding a 32-bit data width. The particular bit values may vary in other embodiments (e.g. 64-bit vs. 128-bit, 16-bit vs. 32-bit, etc.), but generally speaking at least one of the hash algorithms supported within the MDHA system will have an associated bit width that is greater than at least one of the other algorithms.

Input message data is provided to the MDHA in any manner (step 106). In various embodiments, the MDHA contains a first-in-first-out (FIFO) buffer stack that receives data from a client application or process as appropriate. Alternatively, the input message may be stored in shared memory that can be accessed by the MDHA, or data can be input in any manner. Generally speaking, data words are retrieved from the buffer stack into the various registers of the MDHA in a serialized manner, although other embodiments may use parallel, batch or other retrieval techniques as appropriate. Additional data about the MDHA registers is provided below in conjunction with FIGS. 2 and 3.

After data is received at the MDHA, the message digest or other hashed output can be created (step 108). Generally speaking, the MDHA has a set of primary registers used for low-width (e.g. 32-bit) operations and a secondary set of additional registers that can be used to hold additional data during high-width (e.g. 64-bit) operations. Each of these sets of registers may be configured as low-width (e.g. 32-bit), and the additional registers can be bypassed during low-width operations (step 114). That is, if the selected hash algorithm is a relatively high-width algorithm (step 110) having a higher bit width than the bit width of the registers of the MDHA, then the hash feature can be computed using both the primary and secondary registers (step 112). In this case it may be useful to process carry bits resulting from bitwise computations between the primary and secondary sets of registers (step 116), as described more fully below. At the end of the hash computation process (step 108), the computed digest/hash is stored in memory, registers, or the like for subsequent retrieval and use by the originating process (step 118). The computed digest/hash is therefore output for subsequent processing in any manner.

Figure 2:
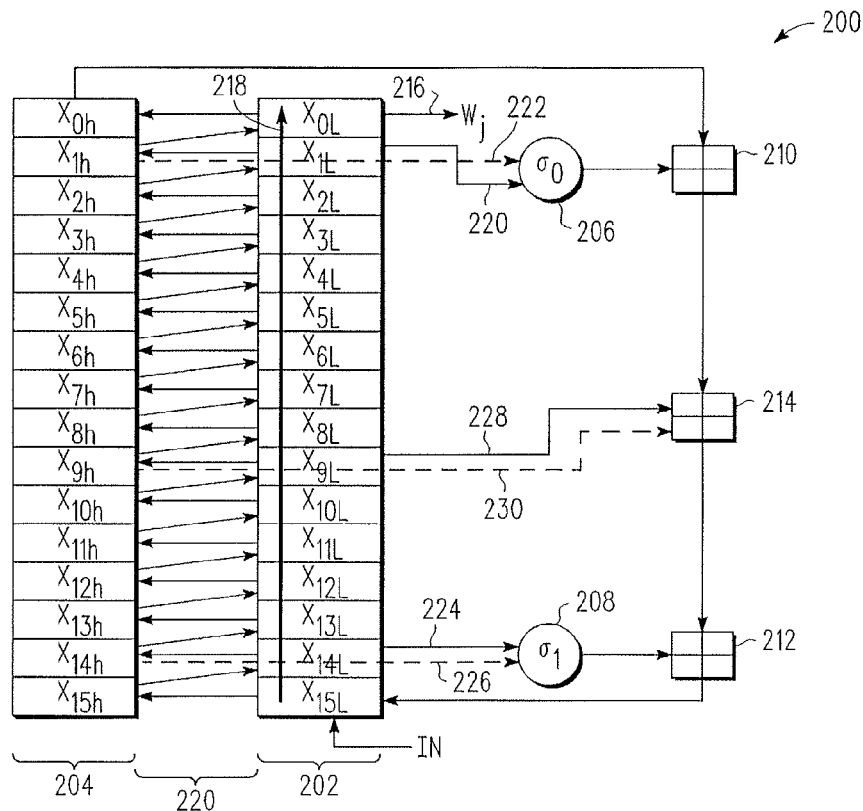
FIG. 2 is a block diagram of an exemplary message digest system having two sets of narrow-width registers.
Figure 3:
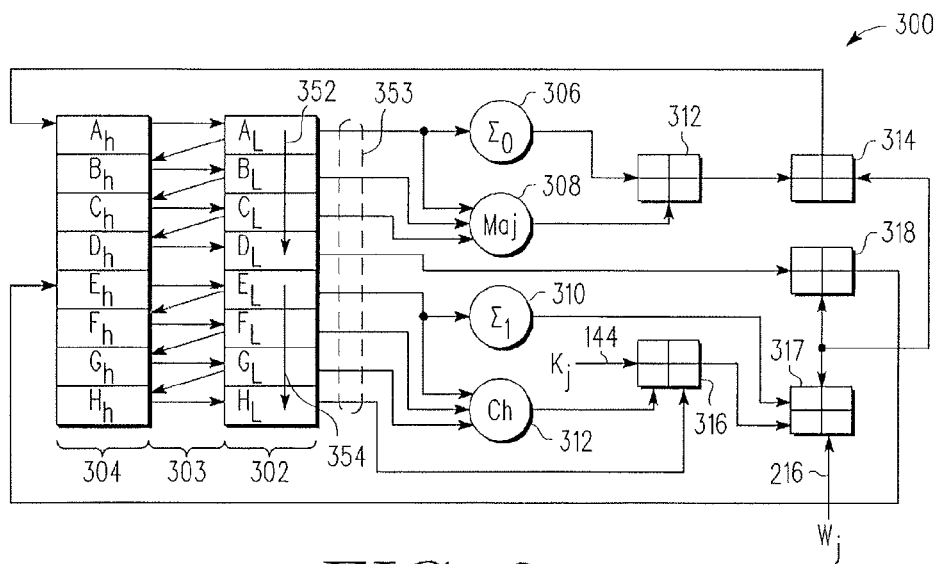
FIG. 3 is a block diagram of another aspect of the exemplary message digest system having two sets of narrow-width registers.

Generally speaking, an MDHA includes a set of message registers, a set of digest registers, and associated control logic to direct the processing and computation of received data and thereby create the output message digest. FIGS. 2 and 3 show this relationship in block diagram form, with FIG. 2 generally representing the portion 200 of the hash process using message registers 202, 204 and FIG. 3 generally representing the portion 300 of the process using digest registers 302, 304. The remaining blocks and elements of FIGS. 2 and 3 represent the control logic used in the process. As noted above, two sets of message registers 202, 204 and two sets of digest registers 302, 304 are provided to accommodate varying bit widths. In a 32-bit implementation, for example, registers 202, 204, 302 and 304 may each be designed to match the 32-bit width of SHA-1, SHA-256, MD5 and other algorithms while still allowing sufficient data storage to accommodate the larger data words associated with larger-width (e.g. 64-bit) algorithms such as SHA-384 and SHA-512.

FIG. 2, for example, shows a first series of primary message registers 202 and a second series of additional message registers 204 used for receiving the input message and for initially compressing the data into a format that can be processed in subsequent stages (e.g. as shown in FIG. 3). In the FIG. 2 example, registers 202 are used in processing 32-bit data, and also can be used to contain the "low-side" (least significant) bits of each 64-bit word. In the latter case, the "high-side" (more significant) bits are stored within registers 204.

The input message is initially provided at any suitable starting location (e.g. the register associated with the low-side of data word "15", as shown in FIG. 2, although any other location could be used in equivalent embodiments). In the lower bit-width mode, data may be shifted through registers 202 as shown by arrow 218. In the high bit-width mode, input data may be serially shifted through the various low and high side registers 202, 204 as shown by arrows 220. Alternately, input data may be loaded in parallel or according to any other technique. While FIG. 2 in this example is described with registers 202 storing "low-side" data and registers 204 storing "high-side" data, this could be reversed in equivalent embodiments. Stated another way, the techniques described herein could be equivalently implemented in "big-endian" or "little-endian" manner.

Control logic within MDHA 200 processes the data stored in registers 202 and 204 to implement the selected hash routine. In this example shown in FIG. 2, logic 206 and 208 perform $\sigma_0$ and $\sigma_1$ functions on data stored in the $X_1$ register and in the $X_1$, $X_9$ and $X_{14}$ registers, respectively. The particularities of these functions are well-defined by the particular hash algorithm, although similarities between different algorithms do exist. The $\sigma_0$ function is defined in SHA-256, for example, to include two "rotate right" operations of 7 and 18 bits, along with an arithmetic shift right operation of 3 bits.

The results of these operations are then "exclusive-or'ed" together on a bitwise basis to arrive at a 32-bit result. In SHA-512, the $\sigma_0$ function is also defined with two rotate right operations and a shift right operation, but the magnitudes of the rotates are one and eight bits, and the magnitude of the arithmetic shift is seven bits, to obtain a 64-bit result. In the case of 32-bit operation, control logic 206 and 208 simply apply the proper bitwise operations to the contents of register array 202. Logic blocks 206 and 208 simply process the contents 220, 224 of registers $X_1$ and $X_{14}$, respectively. When wider data words are used, however, logic 206 and 208 perform similar operations on the contents 222, 226 of the $X_1$ and $X_{14}$ registers of array 204 as well. In this latter case, logic 206 also performs carry operations for bitwise operations carried out on the most and/or least significant bits stored in the various registers. In the event that a "one" value is rotated to the right of the least significant bit of a register in array 204, for example, the most significant bit of the corresponding register in array 202 could be set to processes the shift between registers. Similarly, carries could be provided in the opposite direction (e.g. from array 202 to 204) for little endian operations, or in the case of shifts in a leftward direction, or for any other reason. Addition blocks 210, 212 and 214 similarly perform bitwise addition in either 32-bit or 64-bit mode. In various embodiments, the registers or other digital storage associated with logic 206, 208, 210, 212, 214 may be made slightly larger than the bit width of the data to accommodate mathematical carries. In a 32-bit implementation, for example, addition block 210 may be designed to be at least 33 bits wide to accommodate addition of two 32-bit values with carry out. Similarly, addition block 214 may be 34-bits to accommodate the 33 bits from block 210, as well as the input 228, 230 from registers 202, 204. Addition block 212 may therefore exhibit as many as 35 bits to accommodate the 34 bit value received from block 214. During operation of MDHA logic 200, the data originally stored in message registers 202 and/or 204 is compressed to form a message schedule, indicated at output 216 in FIG. 2, that can be provided to MDHA logic 300 shown in FIG. 3.

Turning now to FIG. 3, MDHA 300 further includes two sets of digest registers 302, 304. In the FIG. 3 example, registers 302 are shown as the low-side portion of the expanded data words represented by the combination of registers 302 and 304. While MDHA 300 is in low-bit-width mode, however, registers 304 may be bypassed in any manner for low-bit-width operation, as indicated by arrows 352 and 354. Like the processing logic described above, the control logic 306, 308, 310, 312, 314, 316, 317 318 is able to operate with either the lower or the higher bit width. In the lower mode, data is obtained from low-side registers 302 only, with bitwise operations taking place as normal. In the high bit width mode, control logic 306-318 performs bitwise operations on both the high-side and the low-side data contained within registers 304 and 302, respectively, while processing any appropriate bit carries between the two registers. This may be accomplished, for example, in a manner similar to that described above in conjunction with FIG. 2, whereby data 353 is provided from low-side registers 302 in the lower-bit-width mode and from both sets of registers 302, 304 in the higher-bit-width mode. While the direct links between registers 304 and the other programming logic are not expressly shown in FIG. 3 to improve the readability of the figure, it will be understood that parallel logical connections from high-side registers 304 exist for each of the low-side connections 353 shown in FIG. 3, in a manner similar to that shown for logical connections 222, 226 and 228 in FIG. 2. Logic 306-318 is therefore able to operate in either the lower or the higher bit width, and to process carries during bitwise operations as appropriate. Bitwise addition modules 312, 314, 316, 317 and 318, for example, will be of sufficient length to process bit carries during the addition process, and logic 306, 308, 310 and 312 will be able to process bitwise functions as defined by the relevant standards and guidelines for the various supported algorithms.

Note that the data word $W_j$ 216 computed in logic 200 is applied at addition block 317 in FIG. 3. The input propagates through the various registers 302 in the low-bit-width mode, and through both registers 302 and 304 in the higher-bit-width mode. The particular functions defined by processing blocks 306, 308, 310 and 312 in FIG. 3 generally correspond to conventional data processing operations that are defined with particularity in the SHA standards, including SHA-256 and SHA-512. Nevertheless, many alterations or reorganizations could be contemplated in a wide array of equivalent embodiments. The particular register values processed by the logical operators and the particular logical functions performed could vary significantly from those described herein, for example. Equivalent concepts to those presented in conjunction with FIGS. 2-3 could be readily adapted and applied to any processing scheme or routine in a wide array of alternate embodiments.

In summary, systems, devices, and methods are configured in accordance with various exemplary embodiments. Some of these embodiments include a method for producing a hashed output of an input message according to any of a plurality of hash algorithms, each of the plurality of hash algorithms having an associated bit width such that at least one of the algorithms is associated with a first bit width and at least one of the algorithms is associated with a second bit width greater than the first bit width. The method comprises the steps of: receiving the input message and a selected one of the plurality of hash algorithms; storing at least a portion of the input message in a first plurality of registers each having a bit width equal to the first bit width; if the selected one of the plurality of hash algorithms is associated with the second bit width, storing a remainder of the input message in a second plurality of registers each having a bit width equal to the first bit width, and otherwise bypassing the second plurality of registers; and computing the hashed output according to the selected one of the plurality of hash algorithms. Other methods may include additional features, such as the step of storing the hashed output in for subsequent retrieval by an external source.

In various embodiments, the computing step comprises performing a carry operation from at least one of the first plurality of registers to at least one of the second plurality of registers, and/or performing a carry operation from at least one of the second plurality of registers to at least one of the first plurality of registers. In certain embodiments, the first bit width is thirty-two bits, and/or the second bit width is sixty-four bits. The plurality of hash algorithms may comprise a SHA-256 algorithm and a SHA-512 algorithm, a SHA-318 algorithm, and/or any other algorithms as appropriate. In still other embodiments, the computing step comprises performing a bitwise addition between two of the first plurality of registers if the selected hash algorithm is associated with the first bit width, and/or performing a first bitwise addition between two of the first plurality of registers and a second bitwise addition between two of the second plurality of registers if the selected hash algorithm is associated with the second bit width. The computing step may further comprise incrementing a result of the second bitwise addition if the first bitwise addition indicates a carry out, and/or incrementing a result of the first bitwise addition if the second bitwise addition indicates a carry out. In a further embodiment, the plurality of hash algorithms comprises a SHA-256 algorithm and a SHA-512 algorithm, and wherein the first bit width is thirty-two bits.

Another embodiment provides a system for producing a hashed digest of an input message according to any of a plurality of hash algorithms, each of the plurality of hash algorithms having an associated bit width such that at least one of the algorithms is associated with a first bit width and at least one of the algorithms is associated with a second bit width greater than the first bit width. The system comprises a first plurality of message registers each having a bit width corresponding to the first bit width; a second plurality of message registers having a bit width corresponding to the first bit width; and control logic configured to receive the input message and a selected one of the plurality of hash algorithms, to store at least a portion of the input message in the first plurality of message registers and, if the selected one of the plurality of hash algorithms is associated with the second bit width, to store a remainder of the input message in the second plurality of message registers, and to compute the hashed output according to the selected one of the plurality of hash algorithms using only the first plurality of message registers if the selected hash algorithm is associated with the first bit width and using the first and second pluralities of message registers if the selected hash algorithm is associated with the second bit width. Such embodiments may be further adapted to comprise first and second pluralities of digest registers, wherein each of the first and second pluralities of digest registers have a bit width corresponding to the first bit width. The control logic may be further configured to produce the hash output using only the first plurality of digest registers if the selected hash algorithm is associated with the first bit width, and to produce the hash output using both the first and the second plurality of digest registers if the selected hash algorithm is associated with the second bit width. Still further, each of the first and second pluralities of message registers may be thirty-two bit registers. In other embodiments, the control logic is further configured to perform a carry operation from at least one of the second plurality of registers to at least one of the first plurality of registers during a bitwise operation of the second bit width.

Still other embodiments provide a computer chip having a message digest hardware accelerator, wherein the message digest hardware accelerator comprises any of the preceding systems.

Another embodiment provides a message digest hardware accelerator system configured to produce a hashed digest of an input message according to any of a plurality of hash algorithms, each of the plurality of hash algorithms having an associated bit width such that a first one of the algorithms is associated with a thirty-two bit width and a second one of the algorithms is associated with a sixty-four bit width. The message digest hardware accelerator system comprises a first and a second plurality of thirty-two bit message registers; a first and a second plurality of thirty-two bit digest registers; and control logic configured to receive the input message and a selected one of the plurality of hash algorithms, to store at least a portion of the input message in the first plurality of message registers and to store a remainder of the input message in the second plurality of message registers if the selected one of the plurality of hash algorithms is a sixty-four bit algorithm, to compute the hashed output according to the selected one of the plurality of hash algorithms using only the first plurality of message registers and the first plurality of digest registers if the selected hash algorithm is a thirty-two bit algorithm and using the first and second pluralities of message registers and the first and second pluralities of digest registers if the selected hash algorithm is a sixty-four bit algorithm, and to process a carry between at least one of the first pluralities of registers and at least one of the second pluralities of registers during a bitwise operation of the sixty-four bit algorithm.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method executable by computing hardware for producing a hashed output of an input message according to any of a plurality of hash algorithms, each of the plurality of hash algorithms having an associated bit width such that at least one of the algorithms is associated with a first bit width and at least one of the algorithms is associated with a second bit width greater than the first bit width, wherein the computing hardware comprises a first plurality of registers and a second plurality of registers, the method comprising the steps of:

receiving, at the computing hardware, the input message and a selected one of the plurality of hash algorithms;

storing at least a portion of the input message in the first plurality of registers, wherein each of the first plurality of registers has a bit width equal to the first bit width;

if the selected one of the plurality of hash algorithms is associated with the second bit width having the second bit width greater than the first bit width, storing a remainder of the input message in the second plurality of registers, wherein each of the second plurality of registers has a bit width equal to the first bit width, and otherwise bypassing the second plurality of registers; and computing, by the computing hardware, the hashed output according to the selected one of the plurality of hash algorithms by performing operations on only the first plurality of registers if the selected hash algorithm is associated with the first bit width and by performing operations on both the first and second pluralities of registers if the selected hash algorithm is associated with the second bit width that is greater than the first bit width.

2. The method of claim 1 further comprising the step of storing the hashed output for subsequent retrieval by an external source, wherein the hashed output has the first bit width if the selected hash algorithm is associated with the first bit width, and wherein the hashed output has the second bit width that is greater than the first bit width if the selected hash algorithm is associated with the second bit width.

3. The method of claim 1 wherein the computing step comprises performing a carry operation from at least one of the first plurality of registers to at least one of the second plurality of registers.

4. The method of claim 1 wherein the computing step comprises performing a carry operation from at least one of the second plurality of registers to at least one of the first plurality of registers.

5. The method of claim 1 wherein the first bit width is thirty-two bits.

6. The method of claim 5 wherein the second bit width is sixty-four bits.

7. The method of claim 6 wherein the plurality of hash algorithms comprises a SHA-256 algorithm and a SHA-512 algorithm.

8. The method of claim 7 wherein the plurality of hash algorithms further comprises a SHA-318 algorithm.

9. The method of claim 1 wherein the computing step comprises performing a bitwise addition between two of the first plurality of registers if the selected hash algorithm is associated with the first bit width.

10. The method of claim 9 wherein the computing step further comprises performing a first bitwise addition between two of the first plurality of registers and a second bitwise addition between two of the second plurality of registers if the selected hash algorithm is associated with the second bit width.

11. The method of claim 10 wherein the computing step further comprises incrementing a result of the second bitwise addition if the first bitwise addition indicates a carry out.

12. The method of claim 10 wherein the computing step further comprises incrementing a result of the first bitwise addition if the second bitwise addition indicates a carry out.

13. The method of claim 1 wherein the plurality of hash algorithms comprises a SHA-256 algorithm and a SHA-512 algorithm, and wherein the first bit width is thirty-two bits.

14. A circuit for producing a hashed digest of an input message according to any of a plurality of hash algorithms, each of the plurality of hash algorithms having an associated bit width such that at least one of the algorithms is associated with a first bit width and at least one of the algorithms is associated with a second bit width greater than the first bit width, the system comprising:
 a first plurality of message registers each having a bit width corresponding to the first bit width;
 a second plurality of message registers having a bit width corresponding to the first bit width;
 control logic configured to receive the input message and a selected one of the plurality of hash algorithms, to store at least a portion of the input message in the first plurality of message registers and, if the selected one of the plurality of hash algorithms is associated with the second bit width, to store a remainder of the input message in the second plurality of message registers, and to compute the hashed output according to the selected one of the plurality of hash algorithms using only the first plurality of message registers if the selected hash algorithm is associated with the first bit width and using the first and second pluralities of message registers if the selected hash algorithm is associated with the second bit width.

15. The circuit of claim 14 further comprising first and second pluralities of digest registers, wherein each of the first and second pluralities of digest registers have a bit width corresponding to the first bit width.

16. The circuit of claim 15 control logic is further configured to produce the hash output using only the first plurality of digest registers if the selected hash algorithm is associated with the first bit width, and to produce the hash output using both the first and the second plurality of digest registers if the selected hash algorithm is associated with the second bit width.

17. The circuit of claim 16 wherein each of the first and second pluralities of message registers are thirty-two bit registers, wherein the first bit width is thirty-two bits, and wherein the second bit width is sixty-four bits.

18. The circuit of claim 14 wherein the control logic is further configured to perform a carry operation from at least one of the second plurality of registers to at least one of the first plurality of registers during a bitwise operation of the second bit width.

19. A semiconductor chip comprising the circuit of claim 14.

20. A message digest hardware accelerator configured to produce a hashed digest of an input message according to any of a plurality of hash algorithms, each of the plurality of hash algorithms having an associated bit width such that a first one of the algorithms is associated with a thirty-two bit width and a second one of the algorithms is associated with a sixty-four bit width, the message digest hardware accelerator comprising:
 a first and a second plurality of thirty-two bit message registers;
 a first and a second plurality of thirty-two bit digest registers; and
 control circuitry configured to receive the input message and a selected one of the plurality of hash algorithms, to store at least a portion of the input message in the first plurality of message registers and to store a remainder of the input message in the second plurality of message registers if the selected one of the plurality of hash algorithms is a sixty-four bit algorithm, to compute the hashed output according to the selected one of the plurality of hash algorithms using only the first plurality of message registers and the first plurality of digest registers if the selected hash algorithm is a thirty-two bit algorithm and using the first and second pluralities of message registers and the first and second pluralities of digest registers if the selected hash algorithm is a sixty-four bit algorithm, and to process a carry resulting from an operation performed on at least one of the first pluralities of registers to at least one of the second pluralities of registers during a bitwise operation of the sixty-four bit algorithm.

* * * * *